March 26, 1957 C. U. DEATON ET AL 2,786,228
HINGE CONSTRUCTION
Original Filed Aug. 3, 1954 7 Sheets-Sheet 1

INVENTORS
CHARLES U. DEATON and
CARL D. GRABER
BY
Frease & Bishop
ATTORNEYS

March 26, 1957  C. U. DEATON ET AL  2,786,228
HINGE CONSTRUCTION

Original Filed Aug. 3, 1954  7 Sheets-Sheet 2

INVENTORS
CHARLES U. DEATON and
CARL D. GRABER
BY
Frease & Bishop
ATTORNEYS

March 26, 1957     C. U. DEATON ET AL     2,786,228
HINGE CONSTRUCTION Original Filed Aug. 3, 1954     7 Sheets-Sheet 3

INVENTORS
CHARLES U. DEATON and
CARL D. GRABER
BY
*Frease & Bishop*
ATTORNEYS

March 26, 1957 C. U. DEATON ET AL 2,786,228
HINGE CONSTRUCTION

Original Filed Aug. 3, 1954 7 Sheets-Sheet 6

*INVENTORS*
CHARLES U. DEATON and
CARL D. GRABER
BY
*Frease & Bishop*
ATTORNEYS

March 26, 1957     C. U. DEATON ET AL     2,786,228
HINGE CONSTRUCTION Original Filed Aug. 3, 1954     7 Sheets-Sheet 7

INVENTORS
CHARLES U. DEATON and
CARL D. GRABER
BY
*Frease & Bishop*
ATTORNEYS

United States Patent Office 2,786,228
Patented Mar. 26, 1957

2,786,228

HINGE CONSTRUCTION

Charles U. Deaton, Kirkwood, Mo., and Carl D. Graber, Orrville, Ohio, assignors to Diebold, Incorporated, Canton, Ohio, a corporation of Ohio Original application August 3, 1954, Serial No. 447,544. Divided and this application March 21, 1955, Serial No. 495,426

9 Claims. (Cl. 16—131)

The invention or discovery relates to hinge construction for vault doors and the like, and the present invention or discovery is a division of the disclosure set forth in the application for United States Letters Patent of Charles U. Deaton and Carl D. Graber, for Vault Door Construction, filed August 3, 1954, Serial No. 447,544.

Prior to the present invention or discovery, usual vault door construction has included a massive crane assembly for hanging and swinging the door to and from closed position in the opening of the frame supporting the vault door.

The objects of the present invention or discovery include the provision of a simplified hinge construction for a vault door which is adapted for operation in conjunction with a pressure system for moving the vault door horizontally between a sealing position in the frame opening and a position at which swinging of the vault door may take place.

A further object of the present invention or discovery is the provision of such an improved hinge construction which has a simplified construction and arrangement of its component parts, such parts being capable of economical manufacture and assembly, and the improved construction being capable of easy operation and easy and economical maintenance.

The foregoing and other objects are attained by the hinge construction, parts, combinations, and sub-combinations, which comprise the present invention or discovery, the nature of which is set forth in the following general statement, and preferred embodiments of which, together with their mode of use, are set forth by way of example in the following description, and which are particularly and distinctly pointed out and set forth in the appended claims forming part hereof.

The nature of the improved hinge construction of the present invention or discovery may be stated in general terms with reference to a vault door construction including members forming a rectangular door frame having a rectangular opening, a door movable into and out of plug fitting location in the opening, the door frame including opposite vertical side members, and a top hinge mechanism and a bottom hinge mechanism operatively interposed between one side of the door and one of the frame side members.

The top hinge mechanism includes roller means which supports the entire load of the door and means resisting tilting of the door, and the bottom hinge mechanism includes means resisting tilting of the door. Each hinge mechanism includes a housing connected with the door and a housing connected with the supporting frame side member, and each hinge mechanism includes a hinge pin located in the frame connected housing and extending into the door connected housing, and means are interposed between each hinge pin and its associate door connected housing for moving the door towards and away from the frame.

At the other side of the door there is operatively mounted one unit of a door and frame engaging mechanism including another unit located in the other frame side member. The door and frame engaging mechanism is operative for making an engagement between the door and the frame when the door is closed and for moving that portion of the door on which the one unit is mounted towards and away from the frame.

Bolt work for the door includes two longitudinally extending bolt bars operatively mounted on the rear of the door and extendable and retractable to and from engaging relationship with end faces of side members of the frame.

Common operating mechanism is mounted on the door and operatively associated with the hinge mechanisms, the door unit of the separable door and frame engaging mechanism, and the bolt work. The common operating mechanism is actuable by a rotatable spoke handle unit projecting from the front face of the door.

By way of example, embodiments of the improved vault door construction and parts thereof, of the present invention or discovery are illustrated in the accompanying drawings forming part hereof, in which.

Similar numerals refer to similar parts throughout the several views of the drawings.

The following descriptive specification is contained in consecutive sections, which are entitled as follows:

I. General Construction.
II. Hinge Mechanisms.

I. *General construction*

The improved vault door construction is indicated generally by 10, and includes members forming a rectangular door frame indicated generally by 11 which is located at the front end of a rectangular vestibule indicated generally by 12. An improved vault door indicated generally by 13 is supported at one side 14 on one of the composite side members 15 of the door frame by an improved top hinge mechanism indicated generally by 16, and by an improved bottom hinge mechanism indicated generally by 17.

At the other side 18 of the door 13 there is operatively mounted one unit indicated generally by 19 of a separable door and frame engaging mechanism. The other unit indicated generally by 20 of the separable door and frame engaging mechanism is located in the other composite frame side member 21.

The bolt work for the door is indicated generally by 22 and is operatively mounted on the rear of the door.

Common operating mechanism indicated generally by 23 is operatively associated with the hinge mechanisms 16 and 17, the unit 19 of the separable door and frame engaging mechanism, and the bolt work 22. The common operating mechanism 23 is actuatable by a rotatable spoke handle unit indicated generally by 24 projecting from the front face 25 of the door 13.

Referring particularly to Figs. 6, 7, 8, and 9, the door 13 is of composite construction and includes a rectangular case constituted by a front plate 26, a back plate 27, a top member 28, a bottom member 29, and side members 30 and 31. In the interior 32 of the door case formed by these plates and members, there is located in a usual manner a relatively thick torch resistant block 33 in the forward portion of the case 32, and a drill resistant plate 34 between the block 33 and the back plate 27.

Figures 21, 22:
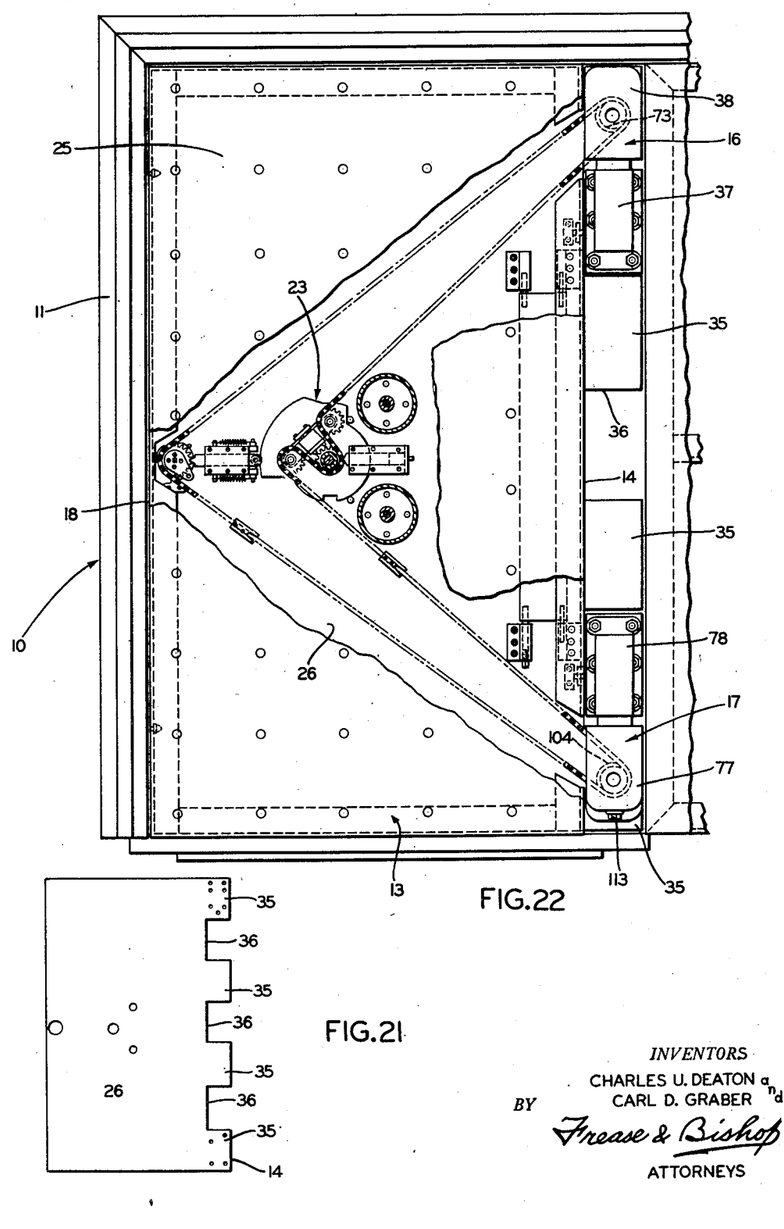
Fig. 21 is a detached elevational view of the front plate of the door.
Fig. 22 is an enlarged fragmentary view of portions of the door and frame similar to Fig. 1, parts being removed, and portions being broken away, for illustrating details of construction.

As best shown in Fig. 21 the door case front plate 26 at the side 14 of the door is formed with alternating tongues 35 and notches 36, each tongue and each notch being rectangular and being sized to interfit with clearance in a registering notch or tongue formed in the frame side member 15.

Figures 1, 2, 3:
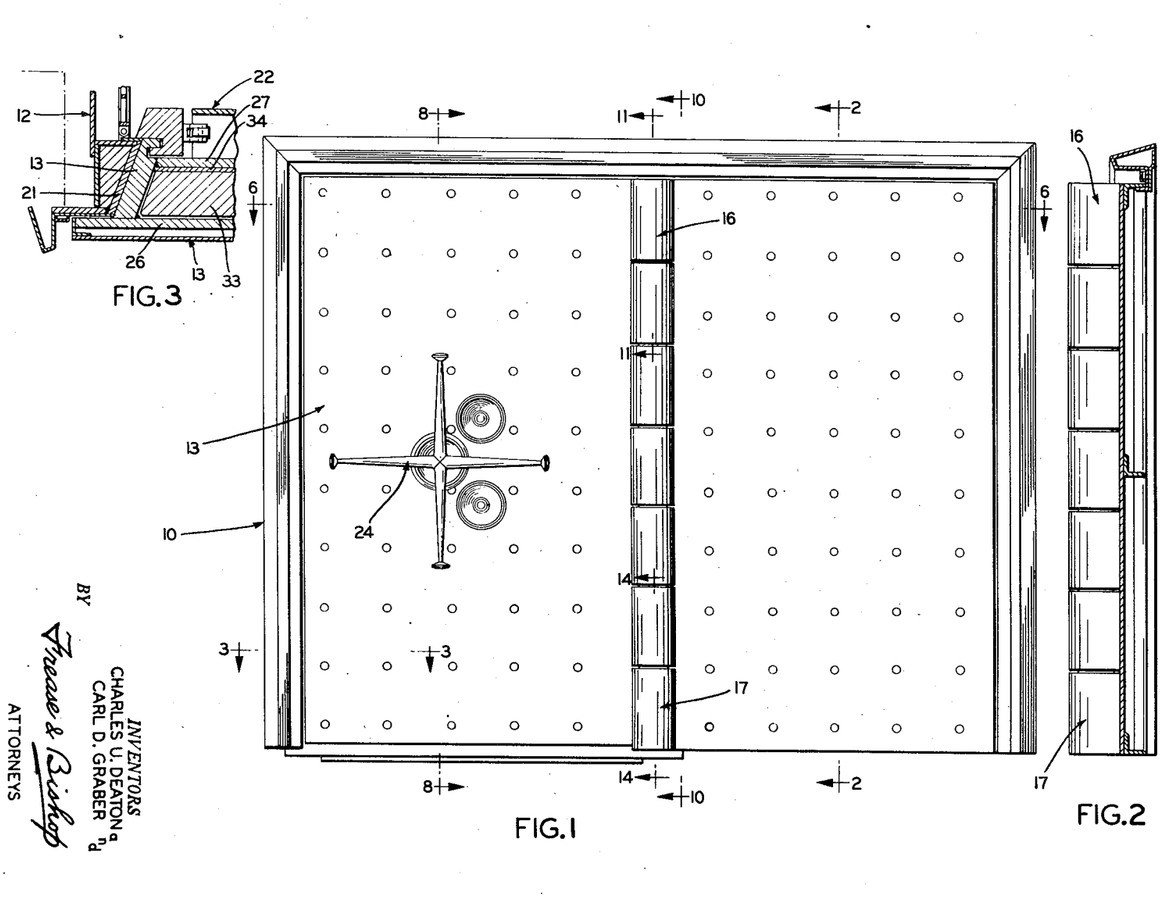
Fig. 1 is a front elevational view of a preferred embodiment of the improved vault door construction, showing the outside or front faces of the door and frame, the door being in the closed position.
Fig. 2 is vertical transverse sectional view thereof, as on line 2—2, Fig. 1, looking in the direction of the arrows.
Fig. 3 is a fragmentary horizontal sectional view thereof, as on line 3—3, Fig. 1, looking in the direction of the arrows.
Figure 4:
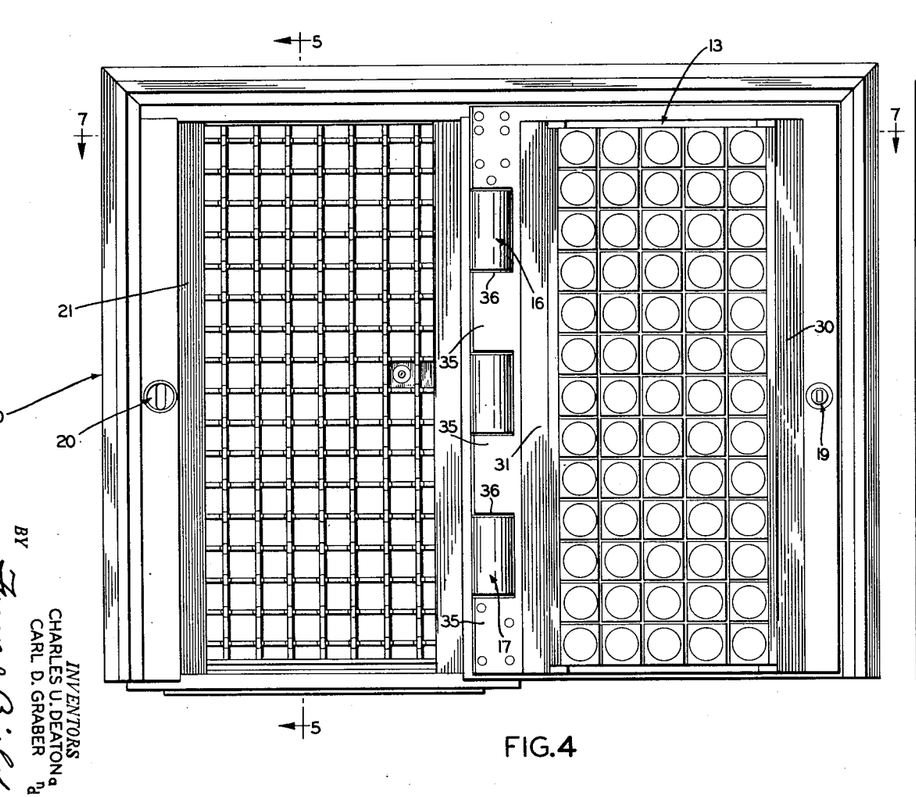
Fig. 4 is a view similar to Fig. 1, showing the door in the open position, and the day gate in the closed position.
Figure 5:
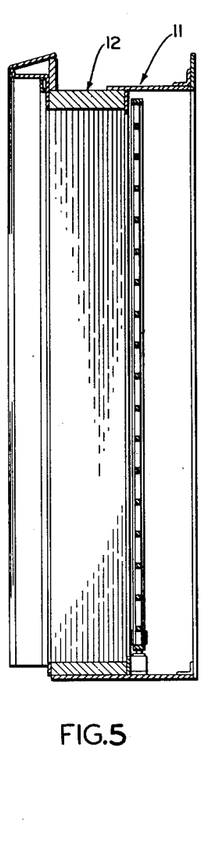
Fig. 5 is a vertical transverse sectional view thereof, as on line 5—5, Fig. 4, looking in the direction of the arrows.
Figure 6:
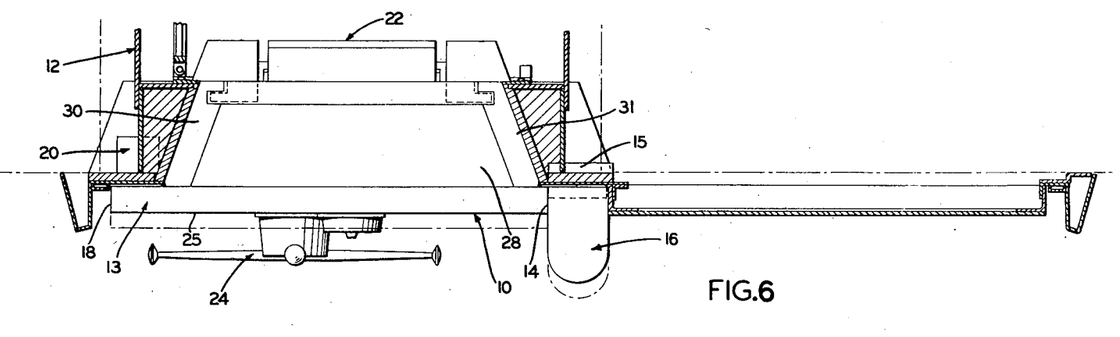
Fig. 6 is an enlarged horizontal sectional view of the door and frame, as on line 6—6, Fig. 1, looking in the direction of the arrows.
Figure 7:
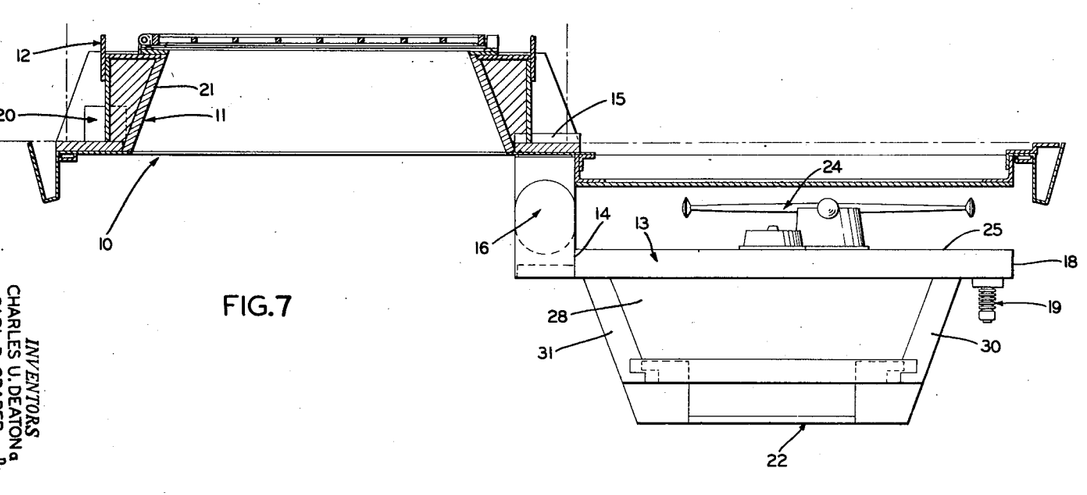
Fig. 7 is an enlarged horizontal sectional view of the door and frame, as on line 7—7, Fig. 4, looking in the direction of the arrows.
Figure 8:
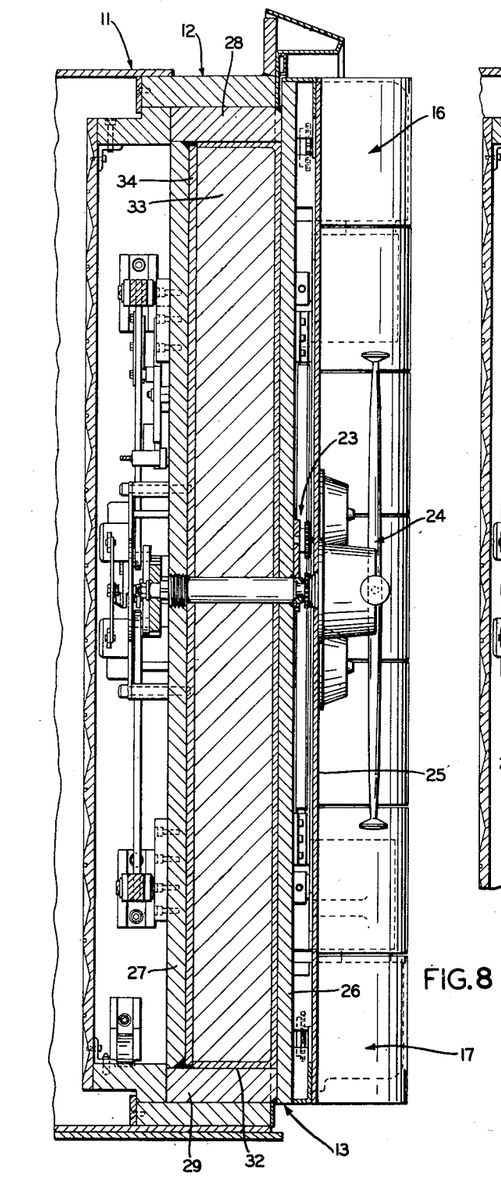
Fig. 8 is an enlargement vertical transverse sectional view of the door and frame, as on line 8—8, Fig. 1, looking in the direction of the arrows.
Figure 9:
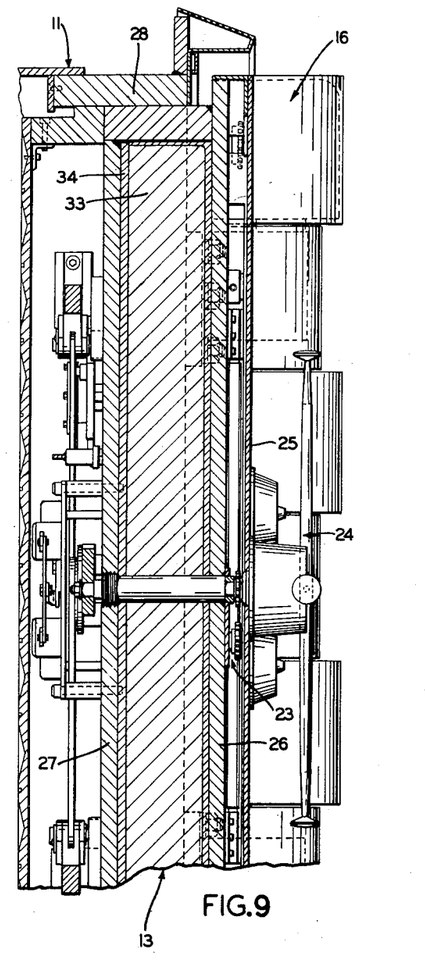
Fig. 9 is a view similar to Fig. 8, showing the door in its position after its operating mechanism has been actuated to perform initial steps in the door opening cycle, whereby the door has been moved horizontally from its plug-sealing position in the opening of the door frame, to a position displaced forwardly from the door frame.
Figures 10, 11, 12, 13:
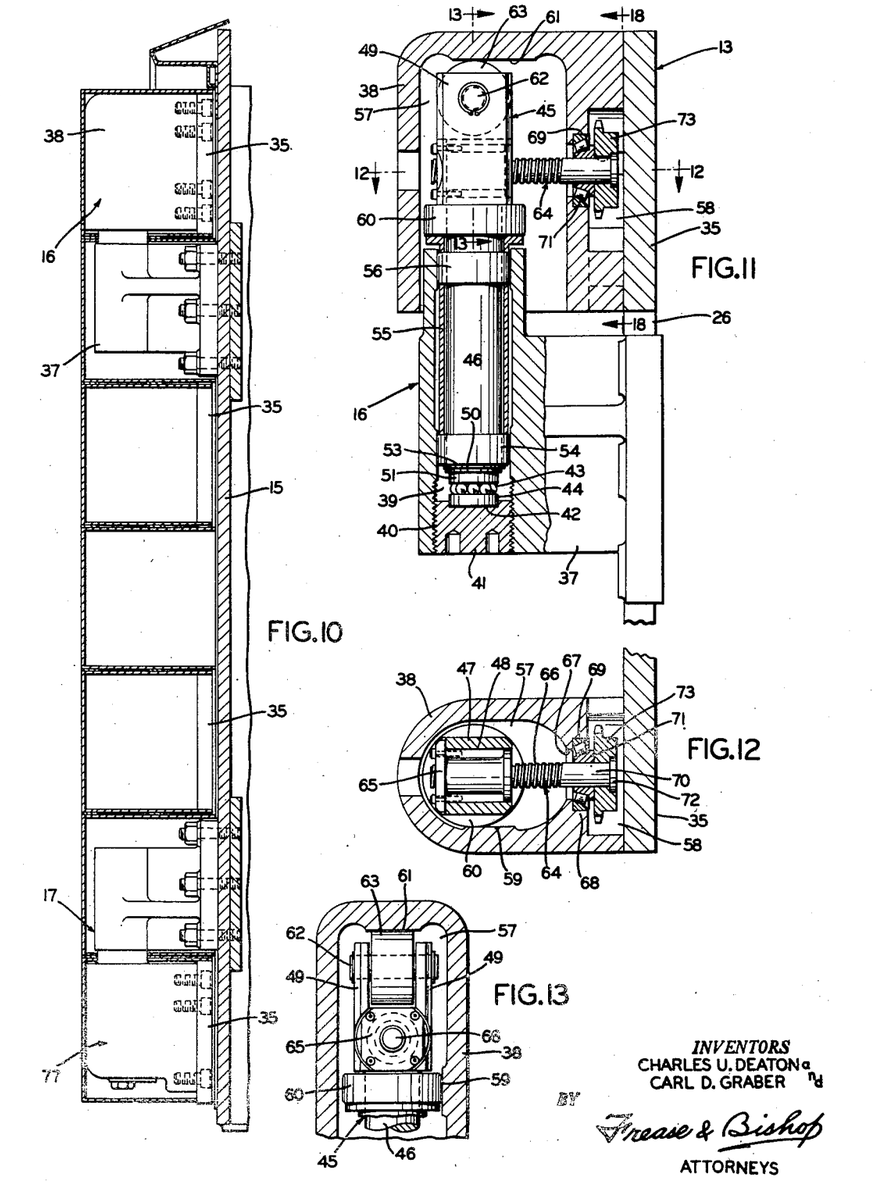
Fig. 10 is an enlarged vertical transverse sectional view as on line 10—10, Fig. 1, looking in the direction of the arrows, portions of the hinge covers and mock hinge covers being shown in section.
Fig. 11 is a fragmentary enlarged side elevational view of the top hinge mechanism corner of the construction, portions being shown in vertical section, as on line 11—11, Fig. 1, looking in the direction of the arrows.
Fig. 12 is a horizontal sectional view of the top hinge mechanism of the construction, as on line 12—12, Fig. 11, looking in the direction of the arrows.
Fig. 13 is a fragmentary vertical transverse sectional view of the top hinge mechanism of the construction, as on line 13—13, Fig. 11, looking in the direction of the arrows.

The top tongue 35 of the door frame plate 26 mounts parts of the top hinge mechanism 16, as best shown in Figs. 10 and 11. Other parts of the top hinge mechanism 16 are supported on the immediately adjacent tongue of the door frame side member 15.

II. *Hinge mechanisms*

Referring to Figs. 11, 12, 13, 18, and 19, the top hinge mechanism 16 includes a lower housing and bearing block 37 mounted on the door frame side member 15, and an upper housing and bearing block 38 mounted on the top tongue 35 of the door front plate 26.

The lower housing and bearing block 37 has formed therein adjacent its front end a vertical bore 39 the lower end of which is provided with internal threads 40 in which is screwed an adjustable thrust bearing mounting plug 41, in the upper end of which there is formed a bearing seat socket 42. A ball thrust bearing 43 has its lower raceway 44 seated in the socket 42.

Figure 19:
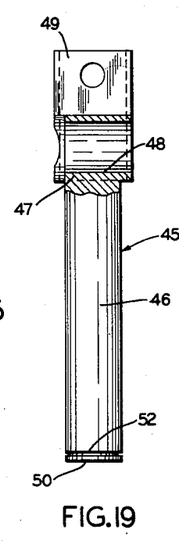
Fig. 19 is a detached view of the pin for the top hinge mechanism of the construction, portions being shown in vertical section.

The hinge pin 45 for the top hinge mechanism 16 is shown detached in Fig. 19, and includes a lower cylindrical shank 46, which makes junction at its upper end with an intermediate nut mounting portion 47 having a bore 48 formed therein, the axis of which intersects and is perpendicular to the longitudinal axis of the shank 46. Above the nut mounting portion 47 of the pin 45, there extends upwardly a pair of laterally spaced roll shaft supporting lugs 49. The shank 46 of the hinge 45 has a lower transverse thrust face 50.

In the assembled hinge mechanism 16, as best shown in Fig. 11, the shank 46 extends into the bore 39 of the block 37, and the thrust face 50 of the shank 46 seats upon the upper raceway 51 of the ball thrust bearing 43. Adjacent the thrust face 50 of the shank 46 there is formed in the cylindrical outer face of the shank 46 a retainer ring groove 52, which in the assembled hinge mechanism 16 seats a retainer ring 53. A lower radial needle bearing 54 fits on the shank 46 and seats on the retainer ring 53, the outer surface of the needle bearing 54 fitting in a central portion of the bore 39. A spacer sleeve 55 fits on the shank 46 and seats on the upper end of the needle bearing 54. An upper radial needle bearing 56 fits on the shank 46 and seats on the upper end of the sleeve 55, the outer surface of the needle bearing 56 fitting in an upper portion of the bore 39.

The upper housing and bearing block 38 has formed therein a downwardly opening socket 57, and the upper end of the shank 46 of the hinge pin 45, the nut mounting portion 47 thereof, and the lugs 49 are located in the socket 57. At the rear of the block 38 there is formed a rearwardly opening socket 58.

At one side of the inner surface of the socket 57 there is formed a flat bearing pad surface 59. On the shank 46 above the upper end of the lower housing and bearing block 37, there is mounted a radial ball or roller bearing 60 the cylindrical outer surface of the outer raceway of which rolls against the flat pad surface 59. The socket 57 has a downwardly facing flat bearing pad end surface 61. Between the lugs 49 at the upper end of the hinge pin 45 there is operatively mounted on a shaft 62 supported by the lugs 49, a load bearing roller 63 upon an upper surface portion of which the downwardly facing flat bearing pad end surface 61 is supported.

By the construction of the top hinge mechanism 16 as thus far described, the entire vertical load of the door 13 is carried from the upper housing and bearing block 38 to the roller 63 and through the pin 45 to the thrust bearing 43, and from the thrust bearing 43 to the lower housing and bearing block 37 and thence to the frame side member 15.

Moreover, in the improved top hinge mechanism 16, the upper housing and bearing block 38 and the door 13 carried thereby are arranged to move in a straight line which is horizontal in the construction 10, and means are provided for moving the block 38 and upper end of the door 13 back and forth on the roller 63.

As shown the means for moving the block 38 back and forth on the roller 63, constitute a ball bearing nut and screw assembly indicated generally by 64, and which includes a ball bearing nut housing 65 which fits in and is secured in the bore 48 of the nut mounting portion 47 of the hinge pin 45. A screw 66 is screwed in the nut housing 65 and extends rearwardly towards the door top tongue 35 through an opening 67 formed in the wall 68 of the block 38 between the socket 58 and the socket 57. The opening 67 is formed with a bearing seat 69, and the screw 66 has a cylindrical shank 70 located in the opening 67, and a tapered roller thrust bearing 71 is fitted on the shank 70 and seated in the seat 69. The outer end of the shank 70 is formed with a head 72, and a sprocket 73 is secured on the shank 70 between the head 72 and the inner raceway of the bearing 71. Rotation of the sprocket 73 and screw 66, by whatever means serves to advance or retract the block 38 and supported door 13 towards and away from the hinge pin 45.

The top hinge mechanism 16 thus constitutes in itself a novel hinge mechanism, which may be used when desired in other constructions than in the illustrated improved vault door 10.

Figure 18:
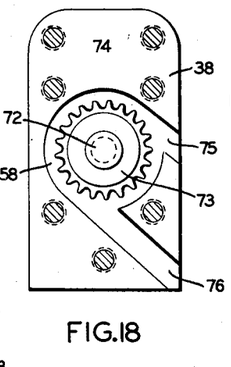
Fig. 18 is a vertical sectional view of the top hinge mechanism of the construction as on line 18—18, Fig. 11.

As shown in Fig. 18 the housing 38 has a back face 74 in which the socket 58 is located, and there is also formed in the back face 74 of the housing 38 sloping chain channel grooves 75 and 76 through which extends the drive chain shown in Fig. 22.

The bottom hinge mechanism 17 is best shown in detail in Figs. 14, 15, 16, 17, and 20, and includes a lower housing and bearing block indicated generally by 77, and which is secured to the lowermost tongue 35 of the door front plate 26.

The bottom hinge mechanism 17 furthermore includes an upper housing and bearing block 78 which is secured to the tongue of the frame side member 15 next above the lowermost door tongue 35.

The upper housing and bearing block 78 has formed therein a vertical bore 79, the upper end of which is formed with internal threads 80, and a screw plug 81 is screwed in the upper end of the bore 79.

Figure 20:
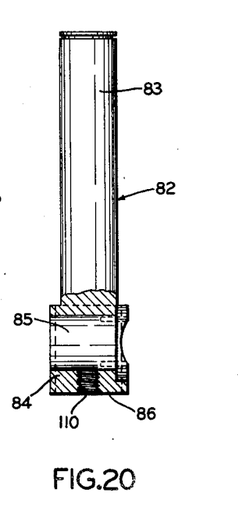
Fig. 20 is a detached view of the pin for the bottom hinge mechanism of the construction, portions being shown in section.

The hinge pin 82 of the bottom hinge mechanism 17 is shown detached in Fig. 20, and includes an upper cylindrical shank 83 and a lower nut mounting head 84 having a transverse bore 85 formed therein, and the bottom face 86 of the head 84 is flat.

The lower housing and bearing block 77 has formed therein an upwardly opening socket 87 which has a lower flat bearing pad end surface 88 and a flat bearing pad side surface 89. The hinge pin 82 is located in the socket 87, and the bottom face 86 of the hinge pin is slidably seated on the bearing bad end surface 88.

Immediately above the hinge pin head 84 there is seated on the shank 83, a radial ball bearing 90 having an outer raceway with an outer cylindrical surface which rolls against the bearing pad side surface 89. The shank 83 extends upwardly from the socket 87 in the lower block 77 into the bore 79 of the upper block 78. Immediately above the ball bearing 90, there is fitted on the shank 83, a needle bearing 91 the outer cylindrical surface of which is fitted in a lower portion of the bore 79. Above the needle bearing 91 a spacer sleeve 92 is fitted on the shank 83; and above the spacer sleeve 92, a needle bearing 93 is fitted on the upper end of the shank 83, and seated on the upper end of the sleeve 92. The outer cylindrical surface of the upper needle bearing 93 is fitted in an upper portion of the bore 79.

By the construction of the bottom hinge mechanism 17 as thus far described, tilting of the door 13 is prevented by the bearing pad side surface 89 thrusting against the radial ball bearing 90.

Moreover, in the improved bottom hinge mechanism 17, the lower housing and bearing block 77 and the lower corner of the door 13 to which the housing 77 is connected are arranged to move in a straight line which is horizontal in the construction 10, and means are provided for moving the block 77 and lower corner of the door 13 back and forth.

As shown, the means for moving the block 77 back and forth constitute a ball bearing nut and screw assembly indicated generally by 94, and which includes a ball bearing nut housing 95 which seats in and is secured to the bore 85 of the nut mounting head 84 of the hinge pin 82. A screw 96 is screwed in the nut housing 95 and extends rearwardly towards the door bottom tongue 35. The lower housing and bearing block 77 has formed therein a rearwardly opening socket 97, there being a wall 98 between the socket 97 and the socket 87, and the wall 98 as formed therein an opening 99 communicating between the socket 87 and the socket 97. The opening 99 is internally threaded, and an externally threaded thrust bearing seat ring 100 is screwed therein, and a roller thrust bearing 101 is seated in the ring 100.

The screw 96 has a cylindrical inner end shank 102 which is fitted in the inner raceway of the roller bearing 101, and there is a thrust flange 103 formed on the shank 102 adjacent the inner ends of the threads of the screw 96, the thrust flange 103 abutting against the outer end of the inner raceway of the roller bearing 101.

The shank 102 extends into the socket 97 where a sprocket 104 is located and secured on the shank 102.

Figure 17:
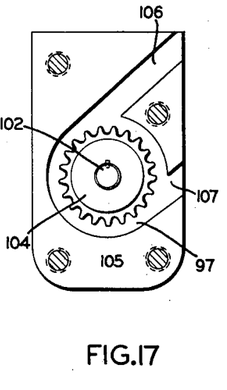
Fig. 17 is a fragmentary vertical sectional view of the bottom hinge mechanism of the construction as on line 17—17, Fig. 14.

The lower housing and bearing block 77 has a rear face 105 through which the socket 97 opens, as best shown in Fig. 17. There are also formed in the rear face 105 of the block 77, upper and lower chain channel grooves 106 and 107 through which extends the drive chain shown in Fig. 22.

Figure 14:
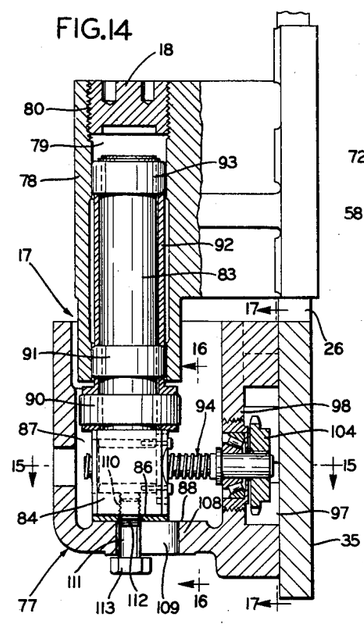
Fig. 14 is a fragmentary enlarged side elevational view of the bottom hinge mechanism corner of the construction, portions being shown in vertical section, as on line 14—14, Fig. 1, looking in the direction of the arrows.
Figure 15:
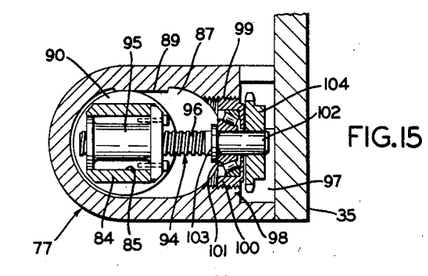
Fig. 15 is a horizontal sectional view of the bottom hinge mechanism of the construction, as on line 15—15, Fig. 14, looking in the direction of the arrows.
Figure 16:
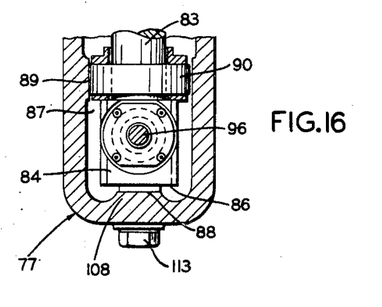
Fig. 16 is a fragmentary vertical transverse sectional view of the bottom hinge mechanism of the construction, as on line 16—16, Fig. 14, looking in the direction of the arrows.

Referring to Fig. 14, the bearing pad end surface 88 is an upper surface of the bottom end wall 108 of the housing and bearing block 77 of the bottom hinge mechanism 17. The end wall 108 has formed therein a central forwardly and rearwardly extending slot 109, and the nut mounting head 84 of the hinge pin 82 has formed therein a lower vertical internally threaded bore 110 extending between the bottom face 86 and the surface 88. A cap screw 111 has a threaded shank 112 extending through the slot 109 and screwed into the bore 110, and has a head 113 spaced a slight distance from the under face of the bottom end wall 108.

This construction of the slotted end wall 108, the cap screw 111, and the hinge pin 82, constitutes holddown means interposed between the hinge pin 82 and the housing and bearing block 78.

We claim:

1. Hinge construction including a pair of spaced housings, a hinge pin pivotally mounted in one of the housings and extending into the other housing, and roller means interposed between the hinge pin and the other housing, the roller means being adapted to support the other housing on the hinge pin.

2. Hinge construction including a pair of spaced housings, a hinge pin pivotally mounted in one of the housings and extending into the other housing, roller means interposed between the hinge pin and the other housing, the roller means being adapted to support the other housing on the hinge pin, and means for moving the hinge pin and the one housing laterally with respect to the other housing.

3. Hinge construction including a pair of spaced housings, a hinge pin pivotally mounted in one of the housings and extending into the other housing, roller means interposed between the hinge pin and the other housing, the roller means being adapted to support the other housing on the hinge pin, and means operatively interposed between the hinge pin and the other housing for moving the hinge pin and the one housing laterally with respect to the other housing.

4. Hinge construction including a first hinge member and a second hinge member, a hinge pin pivotally mounted on the first hinge member, and roller means interposed between the hinge pin and the second hinge member, the roller means being adapted to support the second hinge member on the hinge pin.

5. Hinge construction including a first hinge member and a second hinge member, a hinge pin pivotally mounted on the first hinge member, roller means interposed between the hinge pin and the second hinge member, the roller means being adapted to support the second hinge member on the hinge pin, and means for moving the hinge pin and the first hinge member laterally with respect to the second hinge member.

6. Hinge construction including a first hinge member and a second hinge member, a hinge pin pivotally mounted on the first hinge member, roller means interposed between the hinge pin and the second hinge member, the roller means being adapted to support the second hinge member on the hinge pin, and means operatively interposed between the hinge pin and the second hinge member for moving the hinge pin and the first hinge member laterally with respect to the second hinge member.

7. Hinge construction including a first hinge member and a second hinge member, a hinge pin pivotally mounted on the first hinge member, and means operatively interposed between the hinge pin and the second hinge member for moving the hinge pin and the first hinge member laterally with respect to the second hinge member, the moving means including a nut on the hinge pin and a rotatable screw in the nut, and means rotatably mounting the screw on the second hinge member, and roller means interposed between the hinge pin and the second hinge member, the roller means being adapted to support the second hinge member on the hinge pin.

8. Hinge mechanism for a co-acting door frame and door construction for a vault and the like, the co-acting door frame and door construction being of the type including door frame members engirdling an opening, a door dimensioned for pressure fitting in the opening, the door frame members including opposite side members and one of the frame side members being a door supporting frame member, and the door having a hinge side; the hinge mechanism being operatively interposed between the hinge side of the door and the door supporting frame member, and the hinge mechanism including a housing connected with the door and a housing connected with the supporting frame side member, and a hinge pin pivotally mounted in the frame connected housing and extending into the door connected housing, and means operatively interposed between the hinge pin and the door connected housing for moving the door towards and away from the frame; the door connected housing being an upper housing located above the frame connected housing, and the hinge pin having an upper portion located in the upper housing, and roller means being interposed between the upper portion of the hinge pin and the upper housing.

9. Hinge mechanism for a co-acting door frame and door construction for a vault and the like, the co-acting door frame and door construction being of the type including door frame members engirdling an opening, a door dimensioned for pressure fitting in the opening, the door frame members including opposite side members and one of the frame side members being a door supporting frame member, and the door having a hinge side; the hinge mechanism being operatively interposed between the hinge side of the door and the door supporting frame member, and the hinge mechanism including a housing connected with the door and a housing connected with the supporting frame side member, and a hinge pin pivotally mounted in the frame connected housing and extending into the door connected housing, and means operatively interposed between the hinge pin and the door connected housing for moving the door towards and away from the frame; the door connected housing being an upper housing located above the frame connected housing, and the upper housing having formed thereon a downwardly facing bearing pad, and the hinge pin having an upper portion located in the upper housing, and roller means being interposed between the upper portion of the hinge pin and the downwardly facing bearing pad on the upper housing.

References Cited in the file of this patent

UNITED STATES PATENTS

| | | |
|---|---|---|
| 2,541,567 | Barrett | Feb. 13, 1951 |
| 2,657,421 | Polson | Nov. 3, 1953 |